United States Patent [19]

Guild

[11] 3,748,902

[45] July 31, 1973

[54] GAS FLOW METER

[75] Inventor: Lloyd V. Guild, Bethel Park, Pa.

[73] Assignee: Scientific Kit Corporation, Pittsburgh, Pa.

[22] Filed: Apr. 14, 1972

[21] Appl. No.: 244,314

Related U.S. Application Data

[63] Continuation of Ser. No. 82,687, Oct. 21, 1970.

[52] U.S. Cl. .............................................. 73/194 R
[51] Int. Cl. .............................................. G01f 1/00
[58] Field of Search ................... 73/3, 194 E, 194 R

[56] References Cited
UNITED STATES PATENTS

| | | | |
|---|---|---|---|
| 3,277,707 | 10/1966 | Rodel | 73/194 E |
| 3,248,941 | 5/1966 | McArthur | 73/194 E |

FOREIGN PATENTS OR APPLICATIONS

| | | | |
|---|---|---|---|
| 550,323 | 1/1943 | Great Britain | 73/194 R |
| 1,231,023 | 12/1966 | Germany | 73/194 E |

OTHER PUBLICATIONS

W. J. Gooderham, "Soap Film Calibrators," Society of Chemical Industry Journal, Nov. 1944, pp. 351-352.

Gas-Liquid Chromatography, Interscience Publishers, Feb. 1965, pp. 161-163.

*Primary Examiner*—Charles A. Ruehl
*Attorney*—Hymen Diamond

[57] ABSTRACT

There is disclosed a film flowmeter which is readily portable for field work and which is capable of measuring gas flow of as high as 100 or even 10,000 liters per minute. The meter includes a tube attenuated at the ends with a side-arm for entrance of the gas at one end; the other end being open for exit of the gas. The opening of the side-arm into the tube has an abrupt or sharp boundary to effectuate formation of the film. To accommodate the large-volume flow, the intermediate portion of the tube has a large diameter. To prevent rupture of the film, the attenuated ends taper into the intermediate portions with straight-shoulder surfaces at an internal angle $a$ of no more than about 220° at the attenuated end and an internal angle $b$ of at least about 130° at the intermediate portion. The tube is provided with a reentrant insert for puncturing the film at the exit end and to prevent ejection or carry-over of film solution at the outlet end.

4 Claims, 1 Drawing Figure

United States Patent [19]
Guild
[11] 3,748,902
[45] July 31, 1973
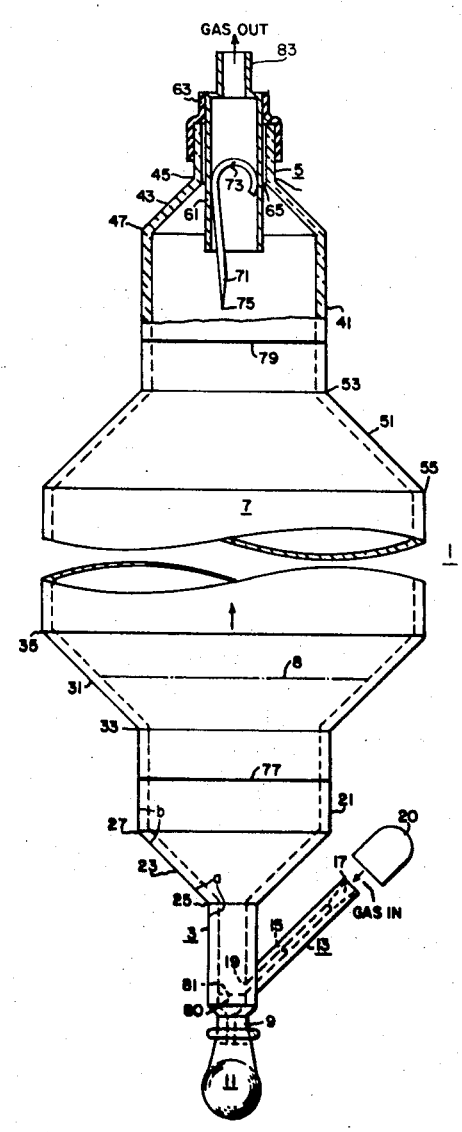

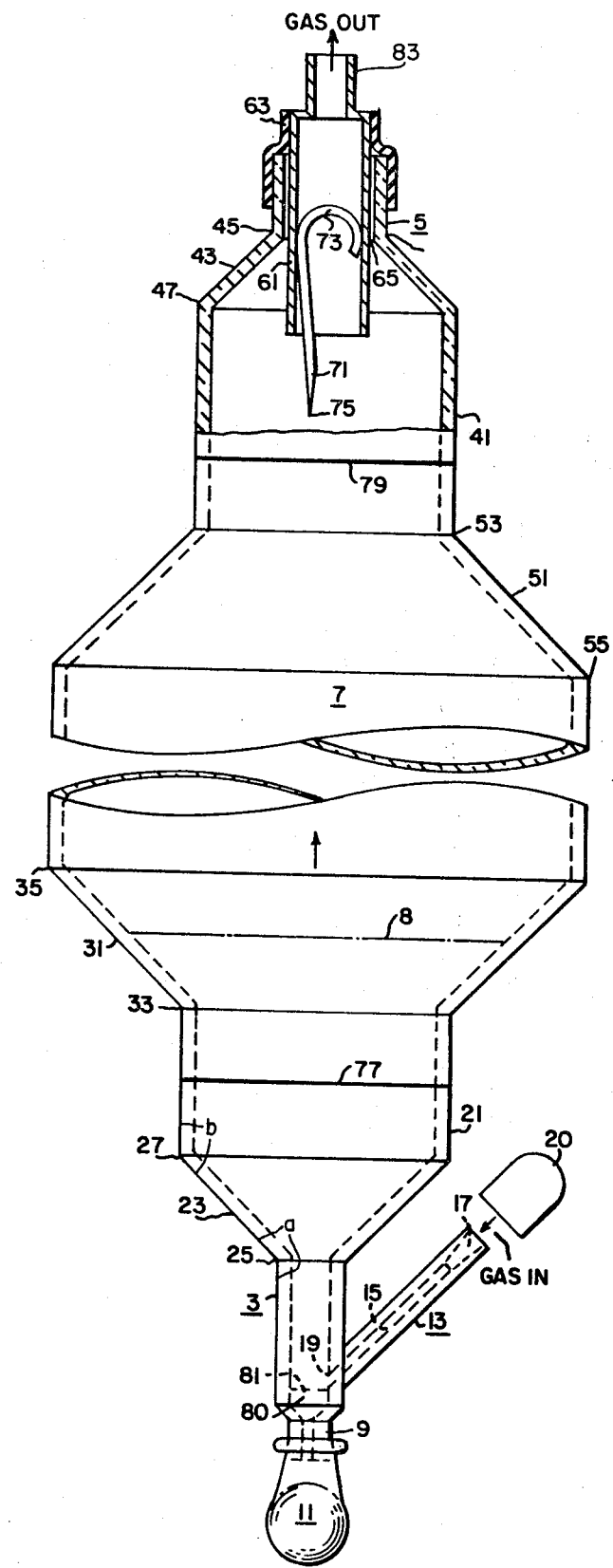

GAS FLOW METER

This is a continuation, of application Ser. No. 82,687 filed Oct. 21, 1970.

BACKGROUND OF THE INVENTION

This invention relates to the art of measuring gas flow and has particular relationship to film flowmeters.

Measurement of the rate at which gas flows is of extensive general utility and interest. For the sake of concreteness, it appears desirable, in describing this invention, to relate it to one of its many areas of use; to the measurement of gas flow in the coal-mining industry and other like industries where pollutants in particulate form suspended in air, which is breathed, constitute a hazard to life and health. In the coal-mining industry some, or all, of the personnel in the mine carry a small battery-operated pump which pumps the air breathed by the miners through a filter at a known rate, typically about 2 liters per minute. The filter is weighed at the beginning and end of exposure intervals, for example about 8 hours, and from the difference in weight the density of particulate matter suspended in the air, to which the miners are exposed, is determined. It is essential that the rate at which each pump passes the air through the filter be known with reasonable, or even high, accuracy, and for this purpose an accurate flowmeter, which can serve as a primary standard and requires no calibration, which is of simple structure, and is readily operable by personnel that is not highly skilled, is essential. It is an object of this invention to provide such a flowmeter.

Film flowmeters, constructed in accordance with the teachings of the prior art, are used, typically in gas chromatography, to measure low-rate gas flow, typically of the order of 1 to 100 milliliters per minute. In such a meter a film derived from a soap or a detergent solution is produced in a tube by the gas whose rate-of-flow is to be measured and is propelled by the gas through the tube. The time of movement of the film between graduations is observed and the rate-of-flow is determined by dividing the volume of the tube between the markers by the time taken by the film to move from the graduation nearest the gas inlet to the graduation nearest the gas outlet.

The operation of a film meter is simple requiring no calibration. It is capable of yielding repeatable results when operated by non-technical personnel and its cost is low.

However, the film flowmeter in accordance with the prior art cannot be used for measurement of gas flow rates of the type demanded by the pumps of the mining industry. Such use requires that the meter be highly accurate and be capable of measuring gas flow to within less than 1 percent, and measure flow rates of the order of liters per minute, a rate far beyond the capabilities of the meters of the prior art. The prior-art flowmeters lack the reliability demanded in the mining industry. At times the film fails to form when the gas is injected into the solution and the film is sometimes ruptured. The tendency of the film to rupture is aggravated at high flow rates. The prior-art meters lack the necessary accuracy and have a carry-over which results in injection of film solution into the pumps under observation. Prior-art film meters are not readily portable, an indispensible demand in the mining industry.

It is an object of this invention to overcome the abovedescribed disadvantages of the prior art and to provide a film flowmeter which shall operate reliably to form films and in the use of which the films shall be impelled without rupture at gas-flow rates from a few hundred milliliters per minute to 100 or 10,000 liters per minute.

A further object of this invention is to provide a film flowmeter that shall be readily transportable for field work, that can be laid in any position when not in use — such as in the trunk of a car — without the solution spilling — that shall be immediately ready for use when needed.

SUMMARY OF THE INVENTION

In arriving at this invention it has been realized that the accuracy of the meter depends principally on precise timing and on precision in the determination of when the timing is to start and stop. The timing can readily be measured accurately to one-tenth or one one-hundredth of a second with a stop watch assuming ordinary reflex capability for the person taking the time. The determination of when the timing starts and stops depends on the observation as to when the film passes a graduation in entering a calibrated or measured volume and when the film passes a graduation in leaving this volume. This coincidence of film and graduation can be observed to between 0.1 millimeter and 0.5 millimeters. It has been realized that the error volume of gas under observation which may flow by reason of a small error in this observation of coincidence should be no more than 0.1 percent to 0.2 percent to achieve the demanded accuracy.

In accordance with this invention the error volume which is produced during the determination of coincidence of film and graduation is minimized by providing the graduations in attenuated portions of the flowmeter. It has been realized however that the speed of movement of the film, which also affects accuracy, is governed by the cross-sectional area of the channel through which the film flows. The attenuated portions where the graduations are impressed should not be of too small cross-sectional area and must be a compromise between a large cross-section through which a large volume of gas flows during the uncertain interval and a very small cross-section through which the film moves at so high a speed as to militate against accurate determination of coincidence.

In accordance with this invention a film flowmeter is provided including a tube through which the film is impelled, which tube is attenuated at the ends and has an intermediate portion of sufficient cross-sectional area and volume to achieve the required precision at high gas-flow rates. The intermediate portion is of substantially greater diameter than the attenuated ends. Typically for a meter through which gas flows at 2 liters per minute, the film should move through the attenuated sections at about 3 centimeters per second. Precision in the measurement of flow rates with an accuracy of less than 1 percent requires that a large volume of gas be conducted through the intermediate portion in a relatively long time interval, of the order of 30 or 60 seconds.

In arriving at this invention it has been discovered that the attenuated ends should taper gradually into the intermediate portion with straight sides. Unless this junction between the ends and the intermediate portion is gradual, the film ruptures on passing one or the other of the junctions or bends. The taper should be straight, — a truncated conical surface where the attenuated ends and the intermediate portion are cylindrical. The internal angle at the attenuated end should be less than about 220° and the internal angle at the expanded intermediate portion should be more than about 130° for Pyrex glass or plastic ordinarily used for the tube; other materials may require different angles.

One of the attenuated ends has a tubular side-arm through which the gas is admitted. In operation the tubulature is sealed up by the solution and the gas is passed through the solution. It has been discovered that for effective formation of the film, the junction at the tubulation where the bore of the tubulation opens into the attenuated end should be sharp.

To facilitate field use of the flowmeter according to this invention, the tube is provided at the gas exit end with means for puncturing the film after it has passed the marker or graduation at the exit end. There is also provision at this end for trapping the solution and preventing its running out of the tube when the tube is laid horizontally.

BRIEF DESCRIPTION OF THE DRAWING

For a better understanding of this invention, both as to its organization and as to its method of operation, together with additional objects and advantages thereof, reference is made to the following description, taken in connection with the accompanying drawing, in which the single FIGURE is a view, partly in section and partly in side elevation, of an embodiment of this invention.

DETAILED DESCRIPTION OF EMBODIMENT

The apparatus shown in the drawing is a film flowmeter 1 capable of measuring gas flowing at a high rate. The flowmeter is a tube 1 of generally circular cross-section attenuated at the ends 3 and 5 including an intermediate portion 7 of substantial diameter corresponding to the rate at which gas is to be conducted through the tube. The tube 1 is composed of a transparent (or translucent) material such as Pyrex glass or plastic.

The end 3, where the film 8 is formed, and its movement is started, tapers into a tip 9 on which a resilient bulb 11 of rubber or the like is secured. The end 3 also has a side-arm 13 with a small-bore opening (typically 2 to 3 millimeters) 15 through which the gas which forms and moves the film is admitted. The side-arm 13 is sealed to the arm 3. The opening 15 is flared out at its outer end 17 but forms a sharp or abrupt junction 19 with the end 3 at its inner end to effectuate formation of a film. A resilient cap 20 of rubber or the like is provided for side-arm 13.

The end 3 tapers gradually into a portion 21 of diameter intermediate those of end 3 and portion 7. To prevent rupture of the film 8 as it passes from section 3 to section 21, the tapered shoulder section 23 is straight as distinct from bulbous having the form of a truncated conical surface and the interior angles *a* and *b* are less than about 220° and more than about 130° respectively at the junction or bends 25 and 27 respectively of the taper 23 and portion 21 and end 3. The portion 21 is also connected to the intermediate portion 7 by a straight tapered shoulder 31 of generally truncated conical form forming internal angles of less than about 220° at junction 33 and of more than about 130° at portion 35.

At the gas-exit end, the attenuated neck 5 tapers into portion 41 of intermediate diameter by a straight shoulder 43 of generally truncated conical form. The shoulder 51 forms angles of less than about 220° and more than about 130° at junctions 53 and 55.

A tube 61 of plastic, glass or metal is secured to the end 5 by a sleeve 63 of resilient material such as rubber or the like. The sleeve 63 and the tube 61 form a fluid-tight annular space 65 at the end 5. The gas flows out through tube 61. A rod 71 of resilient metal (steel typically) forming a loop 73 at one end and having a point 75 at the other extends into tube 61 and is held by the force exerted by the loop 73. The point 75 extends below the end of tube 61. The portions 21 and 41 are provided with graduations 77 and 79 adjacent the junctions 33 and 53 respectively. The graduations 77 and 79 each extends completely around the portions 21 and 41. To avoid errors from parallax the halves of each of the graduations 77 and 79 on both sides of the portions 21 and 41 are aligned so that they each appear as one line during observation of the movement of the film 8.

The volume 65 defined between the inner end of tube 61 and tapered portion 41 should be substantially greater than the volume of bulb 11.

Typically, a flowmeter 1 capable of measuring accurately flow rate of about 2 liters per minute has the following approximate dimensions:

| | |
|---|---|
| End 3 | 10 millimeters |
| Portions 21 and 41 | 30 millimeters |
| Portion 7 | 100 millimeters |
| Tube 61—diameter at inner end | 13 millimeters |
| Overall length | 18–20 inches |

The diameter of portion 5 is sufficiently greater than 13 millimeters to form a reasonable small annulus 65. Graduation 77 is marked on portion 21 at a convenient distance below bend 33. Graduation 79 is then marked so that the volume between graduations 77 and 79 is 1 liter. The lengths of portions 3, 21, 41 and 5 are not critical. Typically, attenuated portion 3 is about 40 millimeters long and shoulders 23 and 51 about 1 inch. The distance from bend 27 to graduation 77 is about 1 inch and the distance from the graduation to bend 33 is about one-half inch. The distance from bend 53 to graduation 79 is between ½ and 1 inch and the distance between the graduation and bend 47 is about 3 inches to allow adequate length for calibration. Portion 5 is about 1 inch.

In the use of the flowmeter 1, cap 20 is removed from side-arm 13 and a solution 80 is poured in through opening 17 to an amount such that the solution 80 in bulb 7 and tube 5 reaches a level such as 81 below bore 15. The pump (not shown) being calibrated is then connected to the end 83 of tube 61. The bulb 11 is then squeezed so that the level of the solution rises above the end 19 of opening 15 sealing off the opening. The pump (not shown) is now started, drawing in air through side-arm 13. This air bubbles through the solution, forming film 8 which moves up tube 1 under the pressure of the air under it. The movement of the film from graduation 77 to graduation 79 is timed by a stop watch (not shown) or other timer and the capacity of the pump is determined by dividing the time taken by the film from graduation 77 to graduation 79 into the volume of gas which moves the film. For a 2-liter per minute pump this time should be about 30 seconds. After the film 8 passes the graduation 79 it is punctured by the point 75 or by the end of tube 61. During transportation the cap 20 is placed on side-arm 13. The tube 1 can be placed in horizontal position without loss of the solution 80; the solution runs into annulus 65 which is of substantially greater volume than the volume of the solution.

While a preferred embodiment of this invention is disclosed herein, many modifications thereof are feasible. This invention then is not to be restricted except insofar as is necessitated by the spirit of the prior art.

I claim as my invention:

1. A film flowmeter for determining the rate of flow of a gas, the said meter including a tube having openings for entrance and exit of the gas, and being attenuated at least at one end and having, between said openings, a portion of substantially greater cross-sectional area than the cross-sectional area at the said end, the attenuated end tapering gradually into the portion of greater cross-sectional area, so that a film, impelled by said gas between said attenuated end and said portion, moves through said tube without being ruptured at the junction between said end and said portion, the said exit opening extending through the end of said tube and said exit opening including means for defining a closed annular space at said exit opening for retaining the liquid from which the film is formed and preventing its ejection from said exit opening.

2. The flowmeter of claim 1 wherein a predetermined volume of film solution is provided near the entrance end of the tube for use in providing a film to measure flow rate and the volume of the closed annular space is substantially greater than said predetermined volume.

3. A film flowmeter for determining the rate of flow of a gas, the said meter including a tube having openings for entrance and exit of the gas, the said exit opening extending through the end of said tube and said exit opening including means for defining a closed annular space at said exit opening for retaining the liquid from which the film is formed and preventing its ejection from said exit opening.

4. The flowmeter of claim 3 wherein a predetermined volume of film solution is provided near the entrance end of the tube for use in providing a film to measure flow rate and the volume of the closed annular space is substantially greater than said predetermined volume.

* * * * *